April 30, 1968   B. W. STOCKBRIDGE ETAL   3,380,360
CAMERA FOR TAKING PARALLAX PANORAMAGRAMS
Filed May 27, 1965   10 Sheets-Sheet 2

INVENTORS
BRUCE W. STOCKBRIDGE
THOMAS O. PATTON
LEROY BISHOP
BY

INVENTORS
BRUCE W. STOCKBRIDGE
THOMAS O. PATTON
LEROY BISHOP

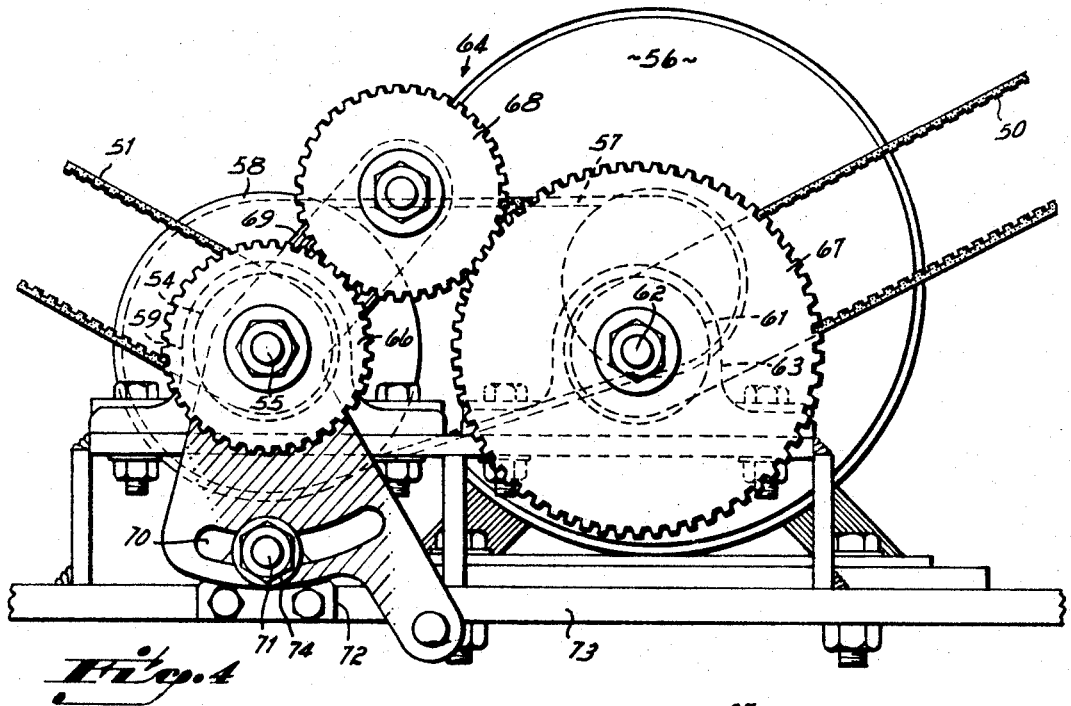
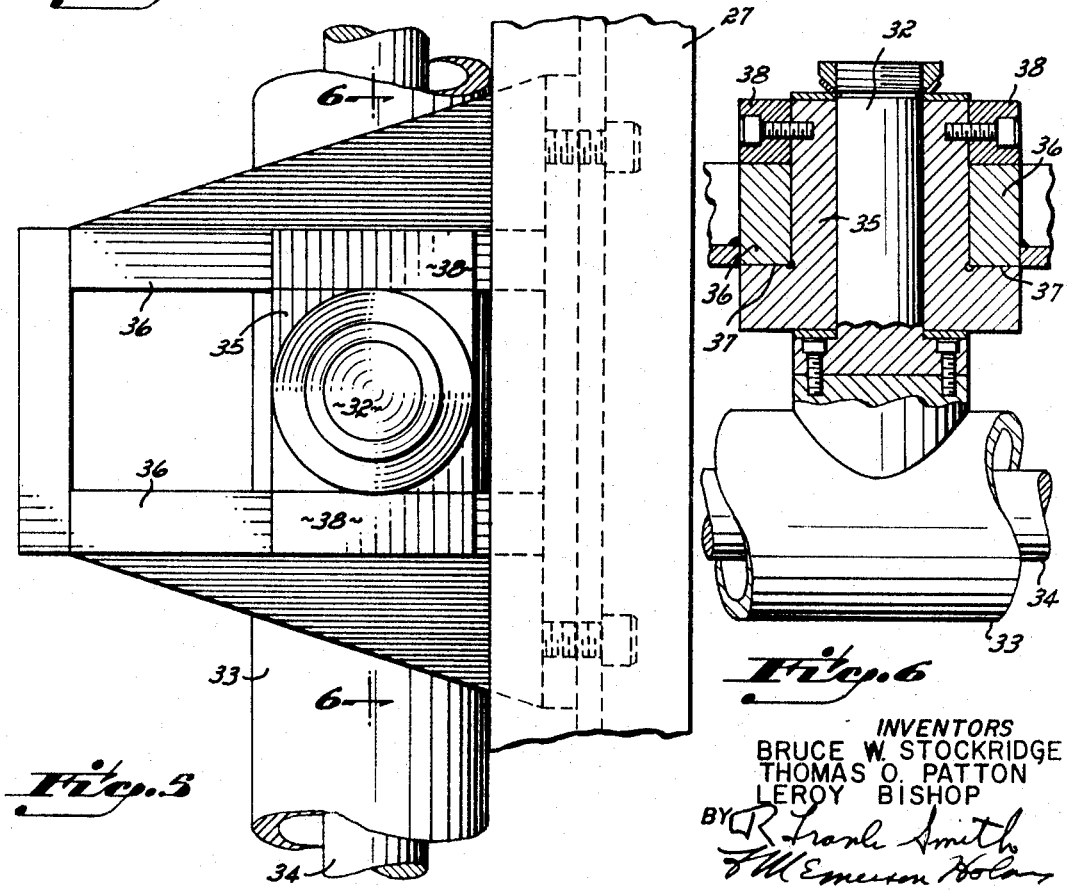

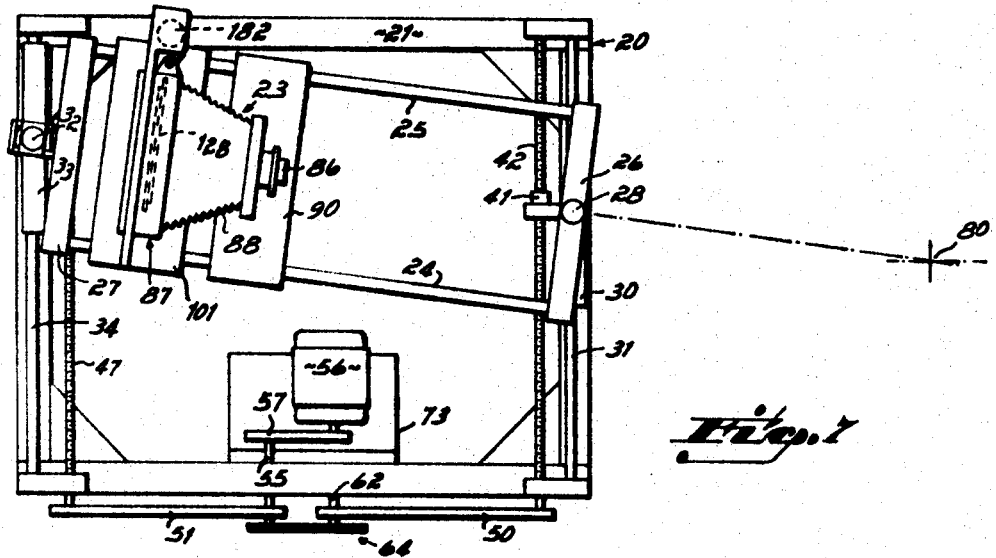
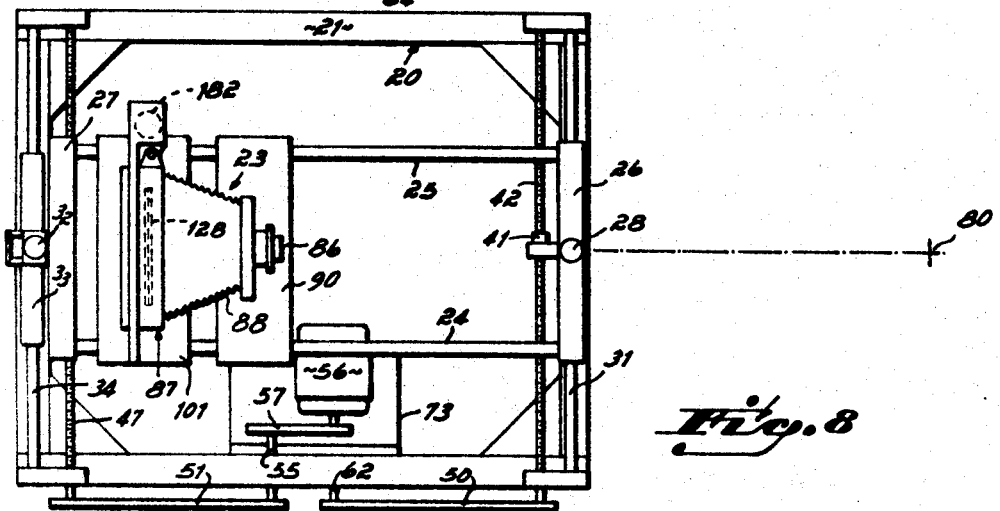
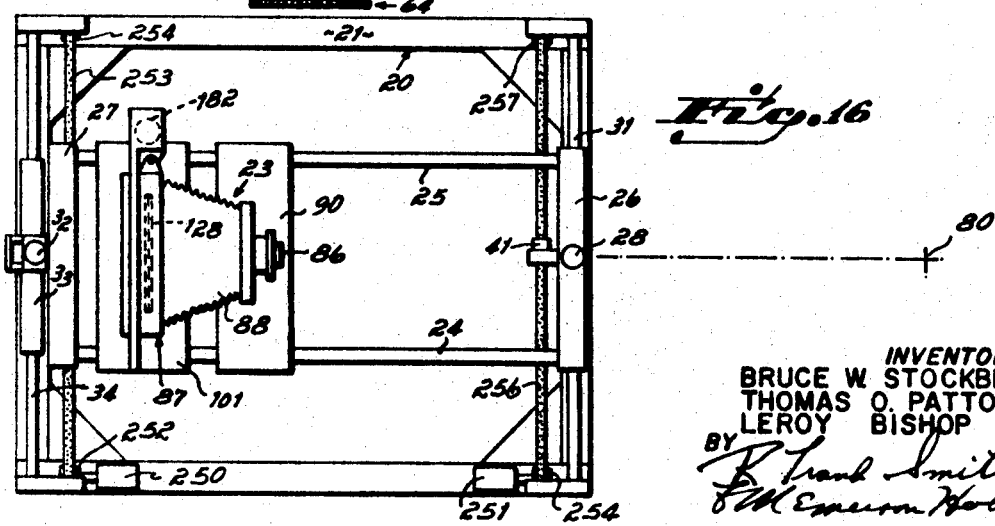

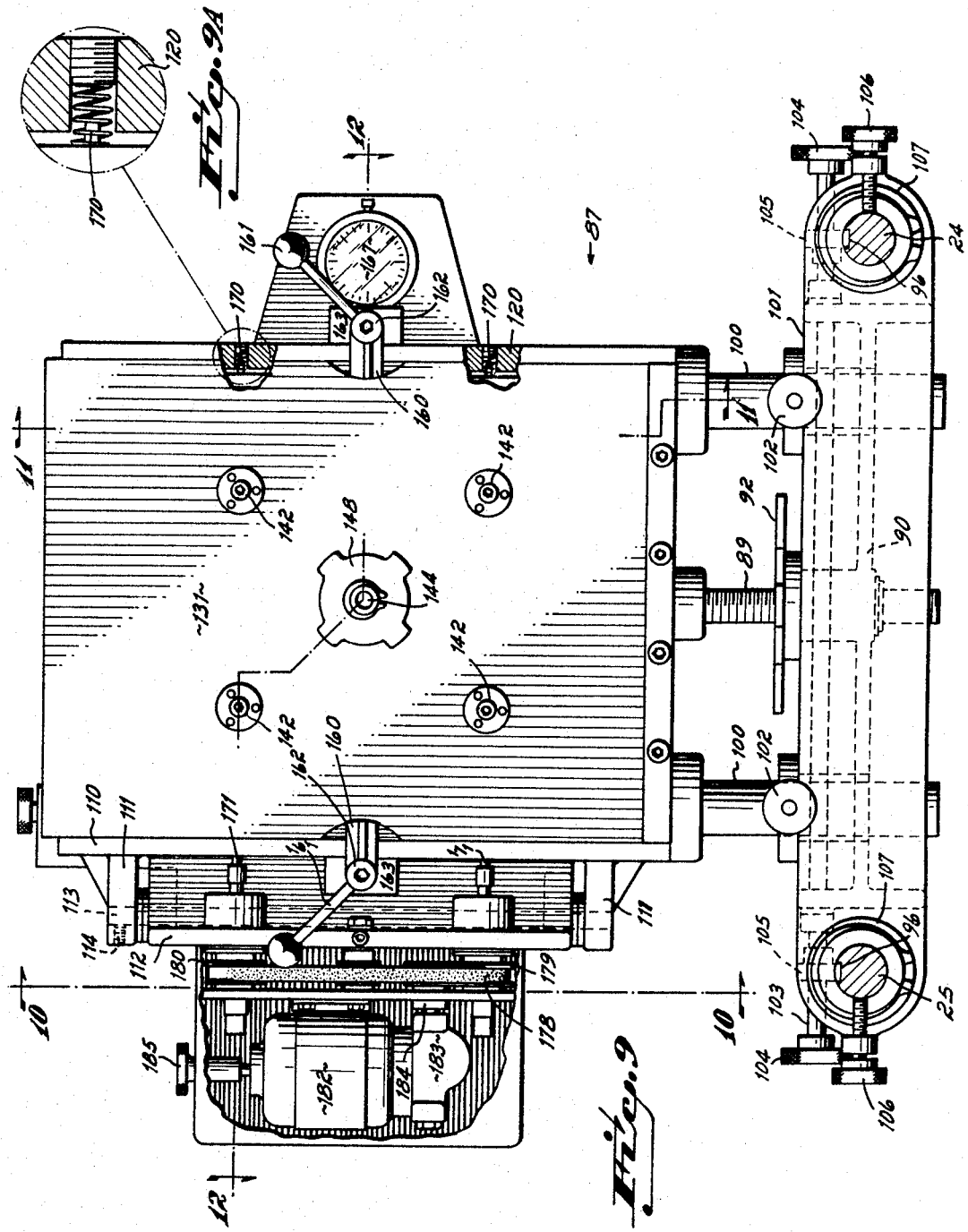

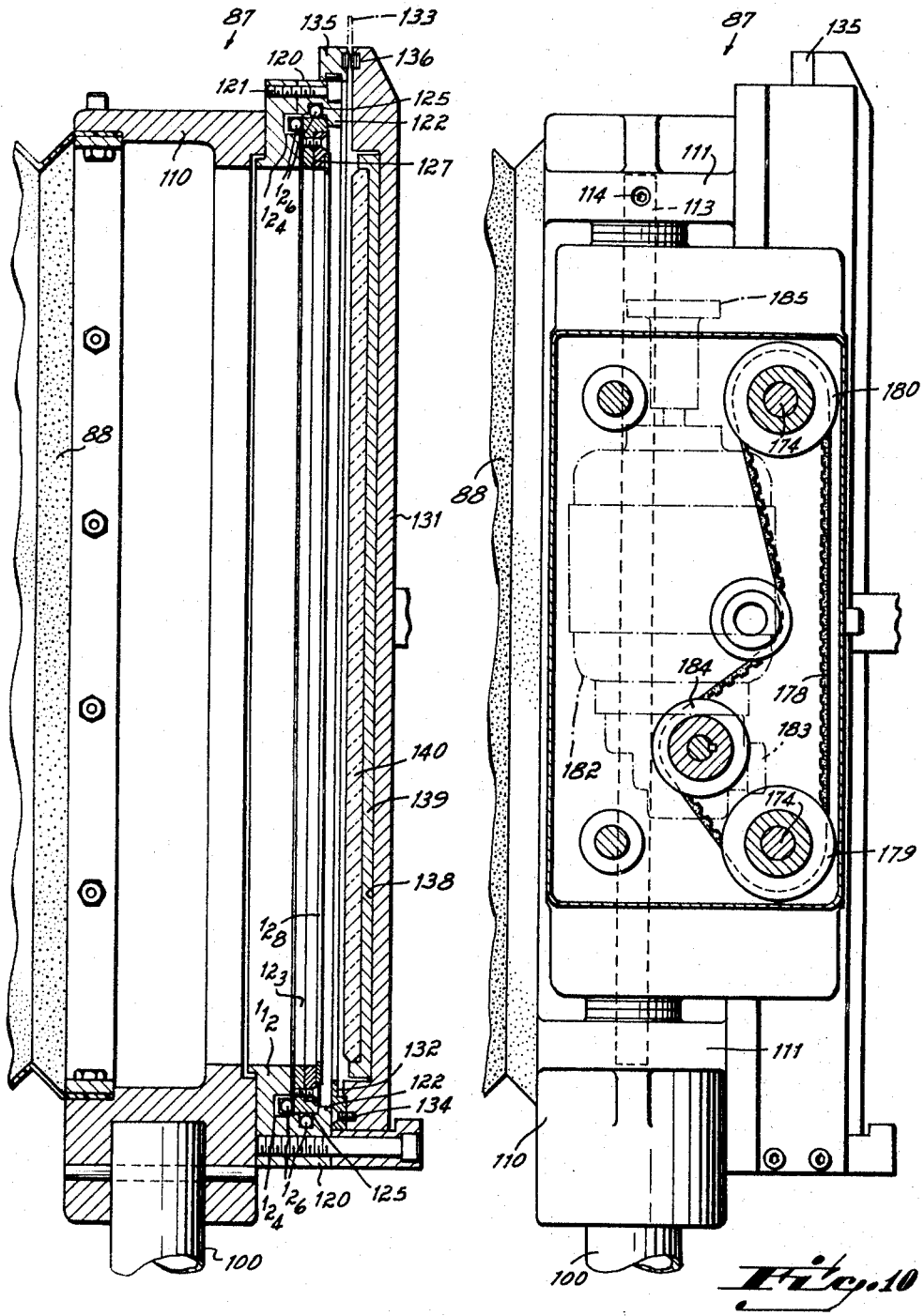

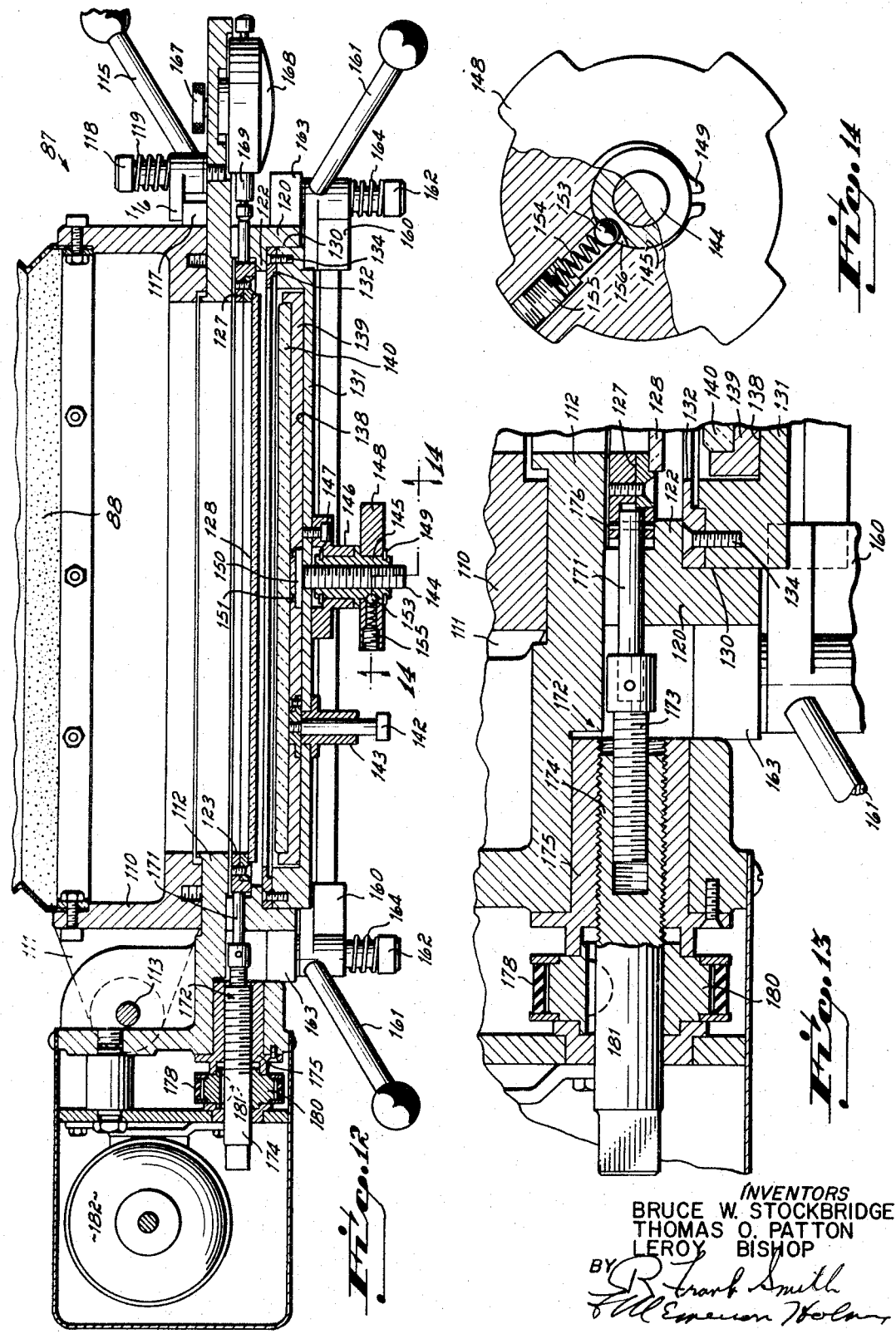

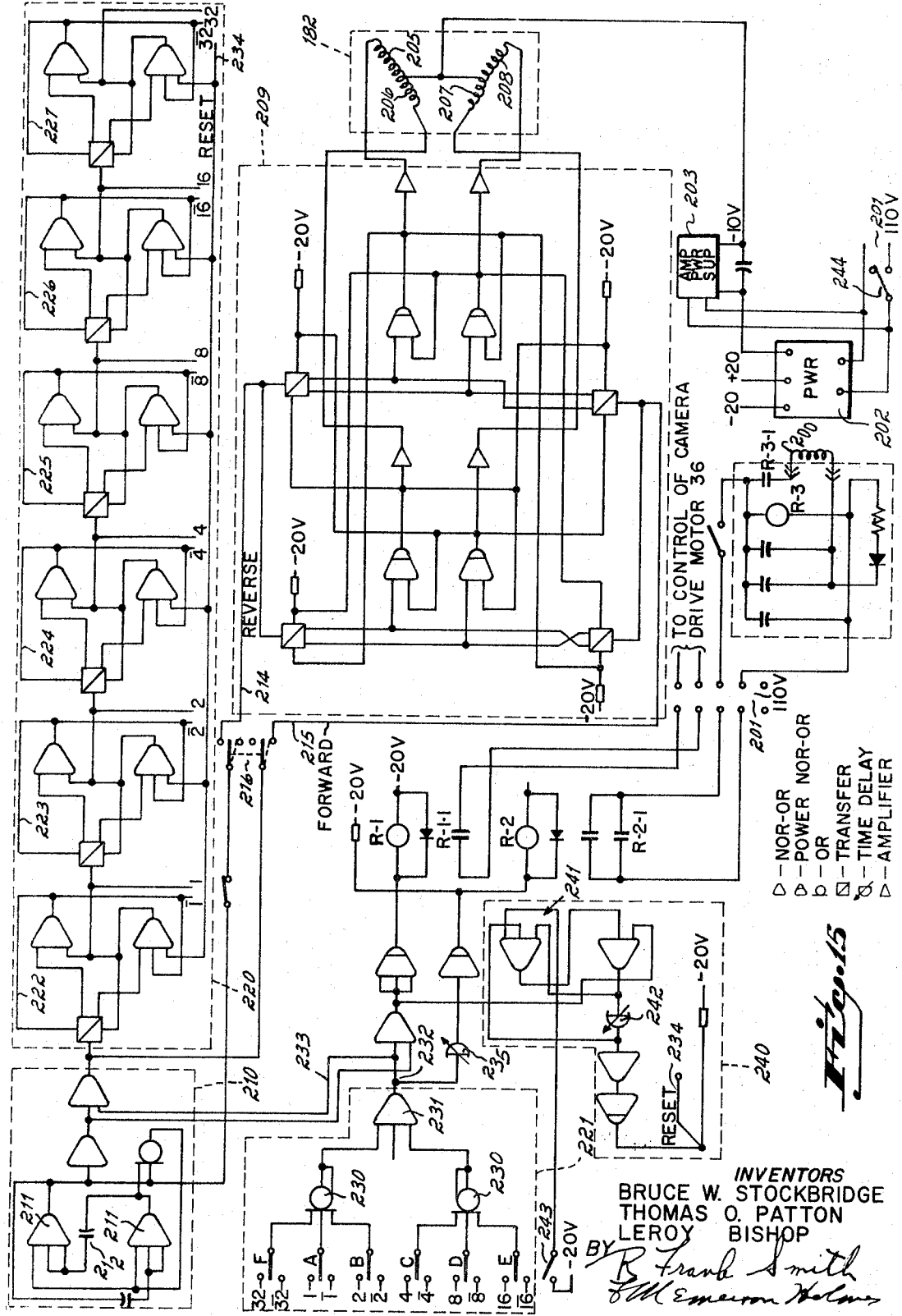

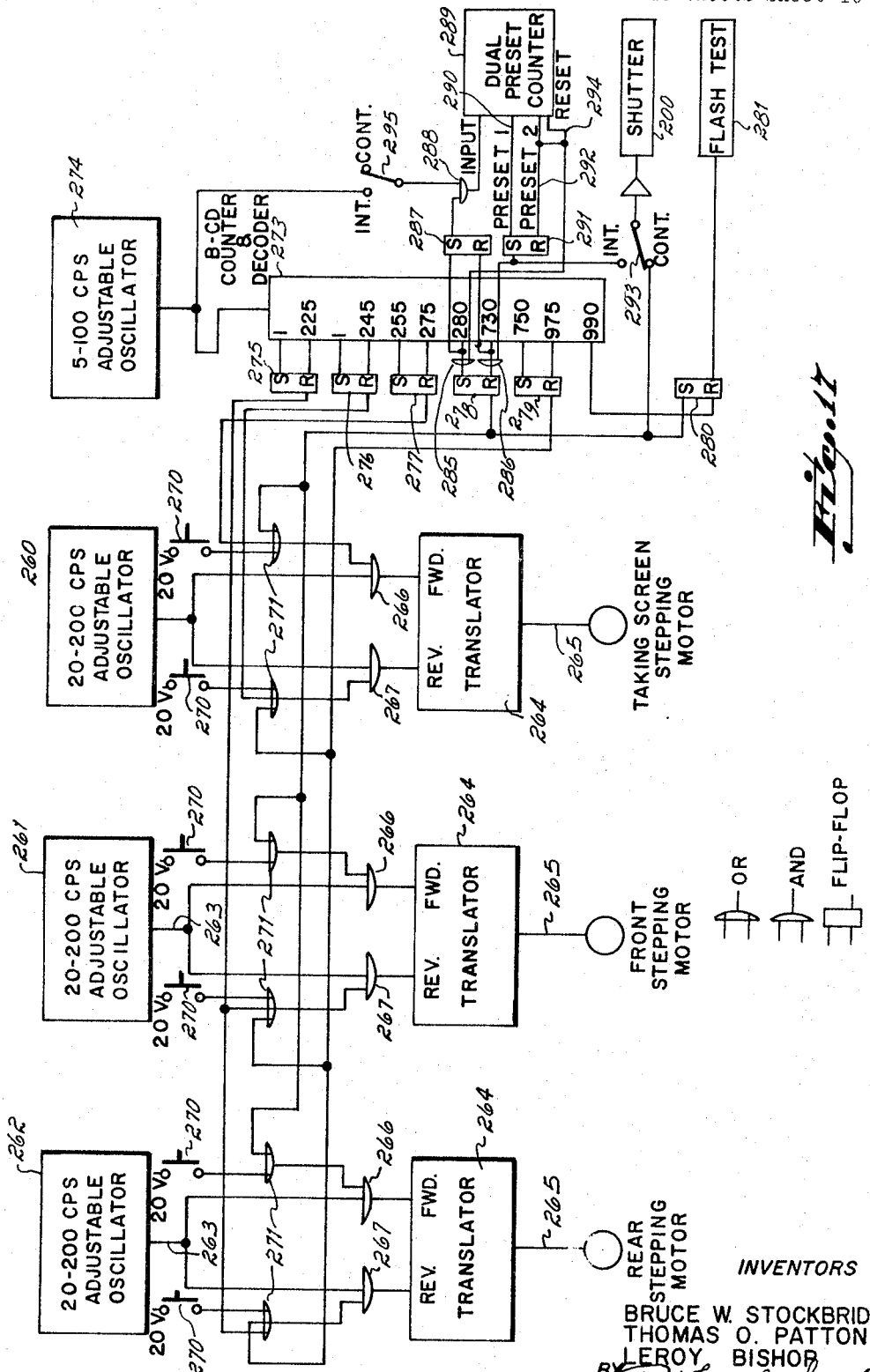

United States Patent Office 3,380,360
Patented Apr. 30, 1968

3,380,360
CAMERA FOR TAKING PARALLAX
PANORAMAGRAMS
Bruce W. Stockbridge, Thomas O. Patton, and Le Roy Bishop, Kingsport, Tenn., assignors to Eastman Kodak Company, Rochester, N.Y., a corporation of New Jersey
Filed May 27, 1965, Ser. No. 459,300
10 Claims. (Cl. 95—18)

This invention relates to a camera and more particularly, the invention is directed to a camera adapted to create a series of exposures on film to form a lineiform image which is used in the making of a parallax panoramagram.

A parallax panoramagram is a three-dimensional picture constituted by a planar film exposed in a particular manner and a lens system through which the image on the film is viewed to create a three-dimensional effect. The film is exposed in a special camera having a grid or taking screen positioned immediately adjacent the film between the lens and the film. The camera is rotated about the object to be photographed and a series of pictures is taken through the taking screen. The taking screen is shifted with respect to the film as the camera is moved to each position.

Stated another way, a parallax panoramagram is a type of stereographic reproduction constituted by a photographed image viewed through a contiguous lens system, the reproduction being obtained through the following series and steps.

First, an object is photographed with a special camera from a plurality of angular positions onto a film having a taking screen disposed in front of the film. The camera is moved and the taking screen is shifted slightly with respect to the film to provide at each screen position a series of images corresponding to the angular position of the camera. When developed, printed, and viewed through the same screen, a stereoscopic effect is obtained, the eyes of the viewer corresponding to two angular positions of the camera. The screen, which is referred to as a viewing azimuth defining means, may be a screen grating having, for example, 100 lines per inch, the light transmitting areas constituting approximately 10% of the area of the screen. Alternatively, the screen may be a lenticular screen, that is, a transparent sheet having a surface embossed with contiguous ribs, each presenting a cylindrical surface and forming a lenticule or lenticular lens.

For the purpose of the description and for the sake of convenience and clarity, it may be assumed that ten distinct exposures are made, one for each angular position of the camera. In making the exposures, it is important that the screen be shifted with respect to the film a distance just sufficient to enable the adjacent images to touch each other without overlapping or without any spaces in between and to have a last image just touch the first image of the immediately adjacent group so that the film is completely exposed. Failure of the images to touch each other results in the final pictures having white lines and any overlapping causes the final picture to have dark lines.

An objective of the invention is to provide a camera having means for mounting and moving a taking screen with respect to the film to provide the precision alignment of images required as described above.

It has been another objective of the invention to provide means for mounting a camera for rotation in a path, which is approximately an arc of a circle, about an object to be photographed and to provide for the coordinated movement of the camera through its series of angular positions with the movement of the taking screen step by step in front of the film.

More particularly, and referring to the camera per se and means for mounting the taking screen, the type of camera and the manner of its use gives rise to problems not normally encountered in studio camera construction. The taking screen must be removably mounted in order to permit interchangeability of screens of a different pitch and to permit the viewing of the object to be photographed on a ground glass plate without interference from the taking screen. Further, the film must be removable, it must be adapted to be brought into contact with the taking screen, and it must be adapted to be covered by a light tight slide.

To the end of providing a structure which will fulfill the requirements above, the invention provides a camera, the rear end portion of which includes a swinging door covering the back end of the camera. The door has means for slidably mounting the taking screen and carries the drive mechanism for stepping the taking screen in a traverse direction. The door further provides means for mounting film adjacent the taking screen and means for moving the film into engagement with the taking screen. Still further, the camera provides means for removably mounting a ground glass plate with the door of the camera swung to an open position thereby carrying the taking screen out of the way for viewing through the ground glass.

It has been another objective of the invention to provide a drive for the taking screen whose increments of movement can be precisely selected and programmed for reproducibility. More specifically, the taking screen drive of the invention is constituted by a stepping motor which rotates through a precise angle with each pulse of current, the motor having a power supply including a pulse generator and a counter for applying a preselected number of pulses to the stepping motor.

In the preferred form of the invention, the camera includes a camera back having a frame plate which is permanently attached to the camera and to which a taking screen is slidably mounted and a film containing case is removably mounted. The frame plate is adapted to swing out of the way to permit the temporary mounting of a ground glass in the plane of the film's normal operating position.

Also in the preferred form, the camera is mounted for movement in an arc about an object to be photographed. Motor means are provided to move the camera and a stepping motor is mounted on the frame plate to move the taking screen. An electrical circuit is connected to the motor means and stepping motor to operate them cyclically and simultaneously, thereby moving the camera and taking screen in coordinated increments of movement to expose the film and to form a lineiform image.

The several objectives of the invention will become more readily apparent from the following detailed description taken in conjunction with the accompanying drawings in which.

Figure 2:
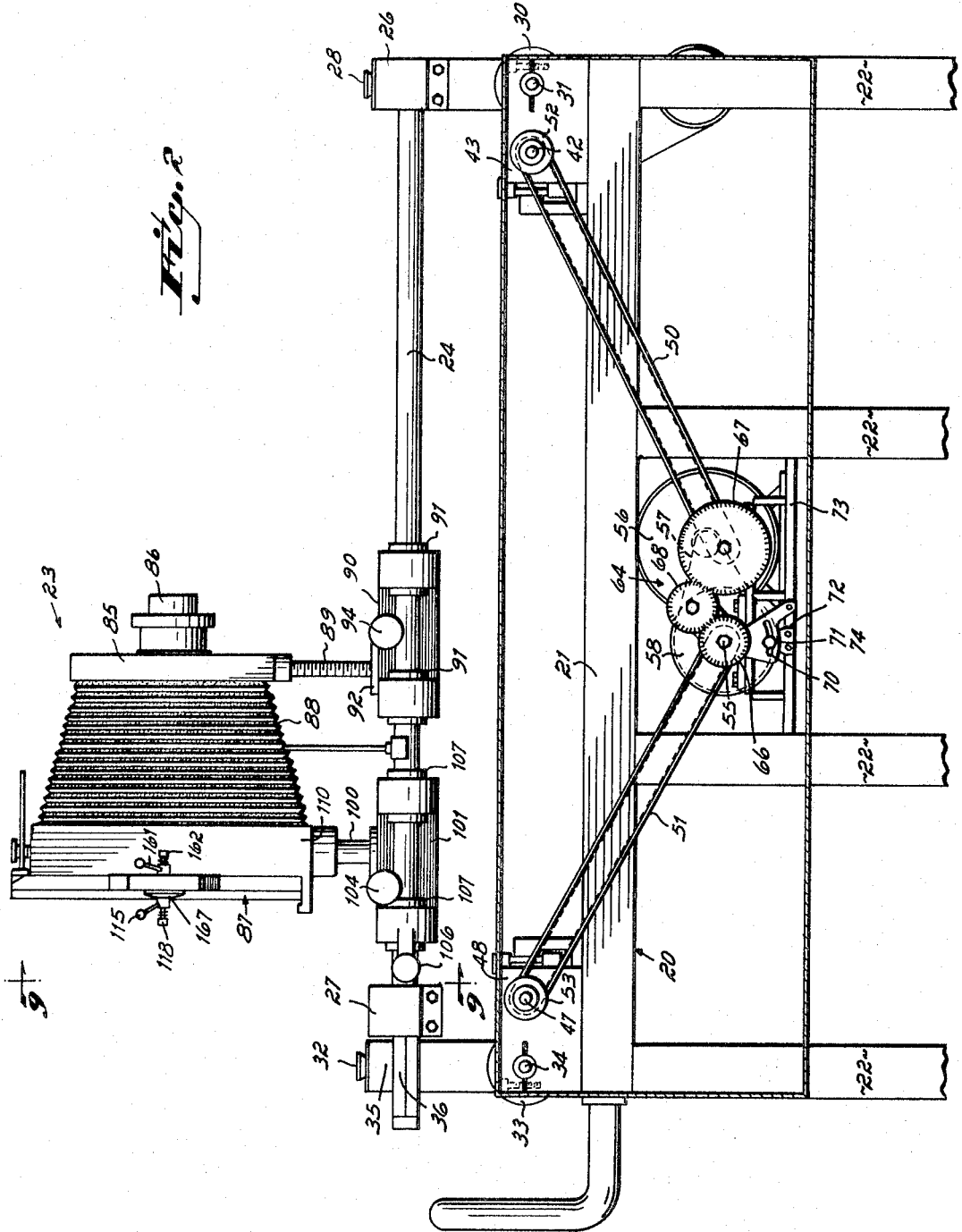
FIG. 2 is a side elevational view thereof.

FIG. 4 is a fragmentary side elevational view showing the change gear system for transmitting motion to the camera drive, FIG. 5 is a fragmentary plan view showing the rear pivot mounting for the camera, FIG. 6 is a cross sectional view taken along lines 6—6 of FIG. 5, FIGS. 7 and 8 are diagrammatic views in plan illustrating the camera movement, FIG. 9 is a rear elevational view of the camera taken along lines 9—9 of FIG. 2,

3

FIG. 9A is an enlarged fragmentary view of the encircled portion of FIG. 9,

FIG. 10 is a cross sectional view taken along lines 10—10 of FIG. 9,

FIG. 11 is a cross sectional view taken along lines 11—11 of FIG. 9,

FIG. 12 is a cross sectional view taken along lines 12—12 of FIG. 9,

FIG. 13 is an enlarged cross sectional view of the taking screen drive screws shown in FIG. 12, FIG. 14 is a cross sectional view taken along lines 14—14 of FIG. 12, FIG. 15 is a diagrammatic view of the electrical circuit for the camera drive system, FIG. 16 is a diagrammatic view of an alternative form of the invention, FIG. 17 is a diagrammatic view of the electrical circuit for the alternative form of the invention illustrated in FIG. 16.

Figure 1:
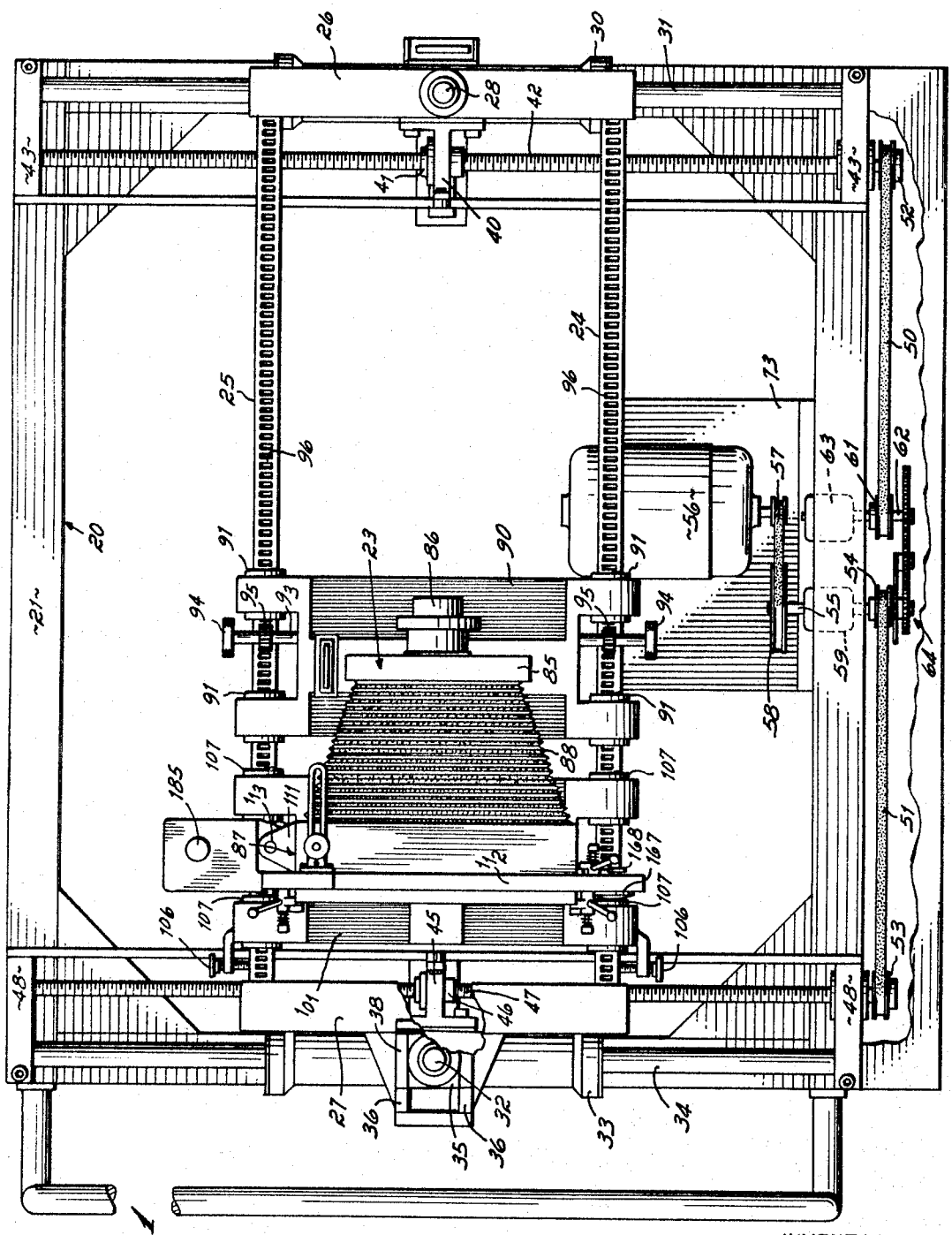
FIG. 1 is a top plan view of the camera and drive system of the invention.
Figure 3:
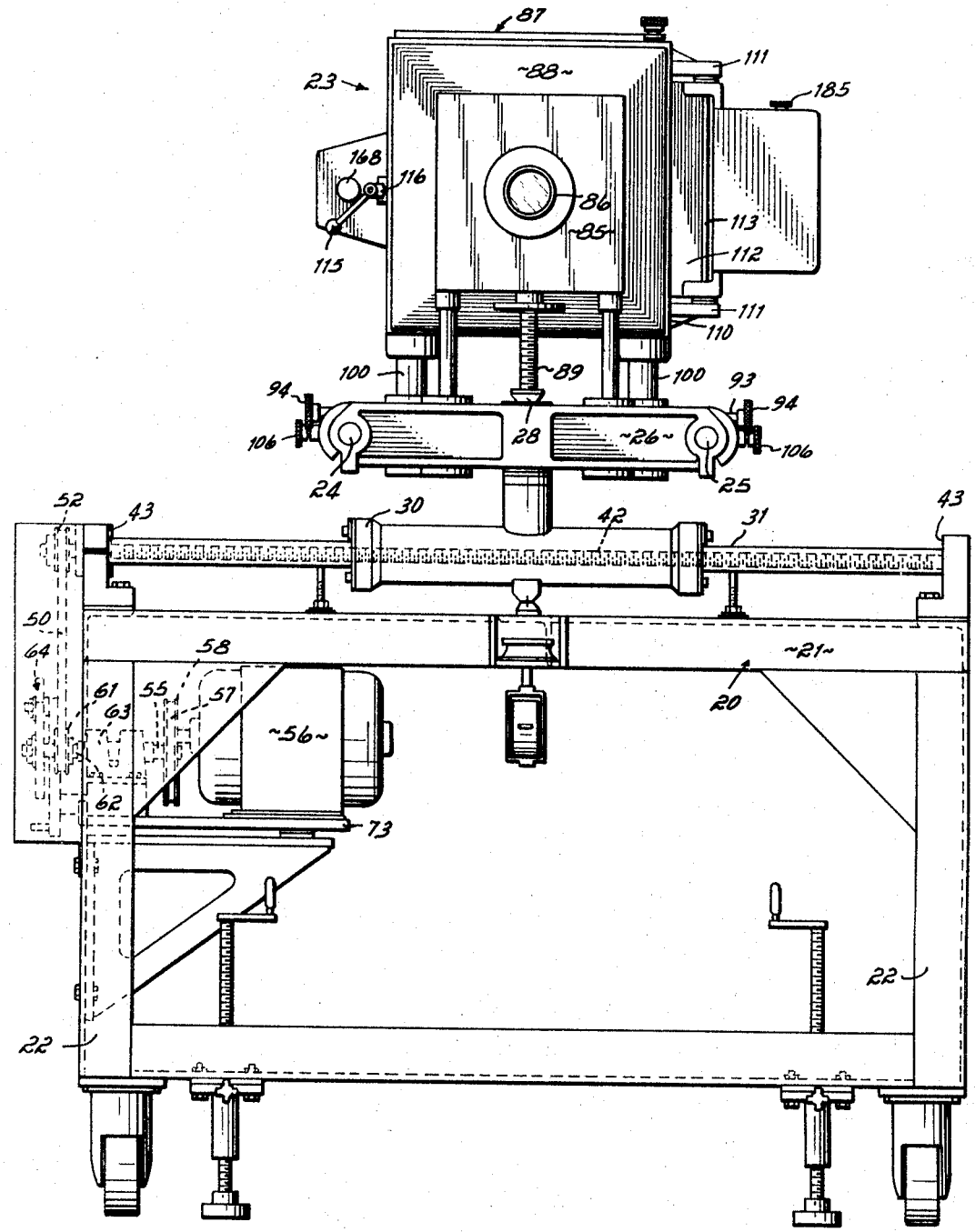
FIG. 3 is a front elevational view thereof.

Referring to FIGS. 1 and 2 and 3, the camera is mounted on a table 20 constituted by a rectangular frame 21 supported on legs 22. The camera indicated at 23 is supported on longitudinally extending camera shafts 24 and 25 which are secured at their forward ends to a front support block 26 and at their rearward ends to a rear support block 27. The front support block is pivoted on pin 28 to a front guide bearing housing 30 which is slidable on a guide shaft 31. Similarly, the rear support block 27 is pivoted on pin 32 to a rear guide bearing housing 33 which is slidable on a rear guide shaft 34.

Since the bearing housings 30 and 33 are going to slide relative to each other, means must be provided for varying the longitudinal spacing between the respective pivot pins 28 and 32 which are fixed to the bearing housings 30 and 33 respectively. To provide for the relative sliding movement, a bearing block 35 (FIGS. 5 and 6) is secured to the bearing housing 33 by the pivot pin 32. A pair of ways 36 are fixed to the support block 29 and are slidable on shoulders 37 of the bearing block 35. Blocks 38 are bolted to the bearing block 35 to sandwich the sliding ways 36 between the blocks 38 and the shoulder 37.

At the front end of the camera a bracket 40 is fixed to the guide bearing housing 30 and carries a traversing nut 41 which is threaded on a traversing screw 42. The traversing screw is mounted in bearings 43 at each side of the frame 21. Rotation of the traversing screw 42 carries the bearing housing 30 and its pivot pin 28 in a traverse direction.

At the rear end of the camera a bracket 45 is fixed to the rear bearing housing 33 and carries a traversing nut 46 which is threaded onto a rear traversing screw 47. The ends of the traversing screw 47 are mounted in bearings 48 at each side of the camera.

The traversing screws 42 and 47 are rotated in the same direction by timing belts 50 and 51 which are connected to pulleys 52 and 53 respectively. The belt 51 is wrapped about its pulley 54 fixed to a shaft 55 which is driven by a motor 56 connected through a belt 57 and pulley 58. The shaft 55 is journaled in a bearing block 59. The belt 50 is wrapped about a pulley 61 secured to a shaft 62 mounted in a bearing block 63. The shaft 62 is driven by the shaft 55 through change gears 64.

The change gears, best illustrated in FIG. 4, comprise a drive gear 66 fixed to the shaft 55 and a change gear 67 fixed to the shaft 62. An idler gear 68 interconnects the drive gear and the change gear. The idler gear is rotatably mounted on a swing arm 69 which is pivoted about the shaft 55. The swing arm has a slot 70 in its lower end portion through which passes a bolt 71 mounted on a bracket 72 secured to a cross beam 73 which is supported on two of the center legs 22. A nut 74 is threaded on the bolt 71 and serves to clamp the swing arm against the bracket 72 when the swing arm 69 is in a desired position.

The ratio of the speeds of the respective belts 50 and 51 is changed by removing the change gear 67 and replacing it with a gear of larger or smaller diameter. When the change is made, the idler gear is swung to a position in which it meshes with the change gear as illustrated in FIG. 4 and is thereafter locked in that position by tightening the nut 74 on the bolt 71.

The motor 56 is a variable speed direct current motor which is operated by a control circuit to be described below. The speed of the motor 56 and the time during which it is energized determine the increments of excursion distance as the camera 23 is swung to its several angular positions. The ratio of speeds of the respective timer belts 50 and 51 determine the arc in which the camera 23 swings.

As illustrated in FIGS. 7 and 8, the rearward end of the camera is always swung to a greater extent than the forward end in order to maintain the camera directed at a focal point indicated at 80.

The camera 23 has a lens holder 85 and lens assembly 86 at the forward end. It has a rear section 87, the lens holder 85 and the rear section 87 being joined by a bellows 88. The lens holder 85 is fixed to a vertical positioning screw 89 journaled in a front base plate 90 the base plate having four bearing bushings 91 slidably mounted on the camera shafts 24 and 25. An elevation nut 92 is rotatably mounted on the base plate 90 and threaded on the positioning screw 89 so that rotation of it will vary the vertical position of the lens holder 85 with respect to the front base 90.

A focusing shaft 93 is journaled in the base plate 90 and has focusing knobs 94 at its ends. A pinion 95 is fixed at each end portion of the focusing shaft 93, the pinions engaging rack teeth 96 in the camera shafts 24 and 25 and the rack teeth 96 being machined in the camera shafts 24 and 25. By rotating the focusing knobs 94, the pinions 95, engaging the rack teeth 96, drive the front base 90 in a forward or rearward direction to focus the camera 23 on the object as well as to vary the longitudinal position of the camera 30 on the camera shafts 24, 25.

The rear section 87 of the camera 23 is similarly mounted. The rear section 87 of the camera is mounted on vertical guide shafts 100 which are vertically slidable in a rear base plate 101. As shown in FIG. 9, a lock stud 102 is engageable with each guide shaft 100 and is threaded in the rear base plate 101 to permit vertical adjustment of the rear section 87 of the camera 23.

A rear focusing shaft 103 is journaled in the rear base plate 101 and is provided with focusing knobs 104 and pinions 105 which engage the rack teeth 96 in the camera shafts 24 and 25 to permit longitudinal adjustment of the rear section 87 of the camera 23. A pair of lock studs 106 are threaded in the base 101 and are engageable with the camera shafts 24 and 25 to lock the rear section of the camera 23 in the desired longitudinal position. The rear base plate 101 has a bearing bushing 107 at each of its four corners which slidably mount the rear base 101 on the camera shafts 24 and 25.

Referring to FIGS. 9 through 14, the rear section of the camera 23 has a camera frame 110 to which the bellows 88 is attached as shown in FIG. 12 and to which the supporting guide shafts 100 are fixed. A pair of hinge brackets 111 project laterally of the camera rear frame 110 and support a rear frame plate 112 which is pivoted thereto by a pintle 113 fixed in the upper bracket 111 by a screw 114. The frame plate 112, when in operative position, is locked to the rear frame 110 by a handle 115 which carries a lock dog 116 engageable with a latch cam 117. The handle 115 is pivoted on a bolt 118 threaded in the frame plate 112 and is spring loaded by a compression spring 119.

A retaining frame 120 is secured by bolts 121 (FIG. 11) to the frame plate 112. The retaining frame has an inwardly directed flange 122 around its periphery which captures a taking screen plate 123 between the rear frame plate 112 and the flange 122. As shown in FIG. 11, the rear frame plate 112 and the retaining flange 122 are slotted as at 124 and 125 respectively, the slots receiving bearings 126 on which the taking screen plate 123 rides during the operation of the camera 23.

The taking screen plate 123 has a peripheral recess 127 which receives the taking screen 128. The taking screen 128 may be a grating constituted by a plurality of vertical opaque lines having vertical slits therebetween or may be constituted by a lenticular screen having a plurality of vertical lenticules.

The retaining frame 120 is recessed as at 130 around its periphery to receive a film case 131. The film case carries on its inner surface a slide holder 132 to receive a light tight slide 133 shown in broken lines in FIG. 11. The slide holder is secured to the film case 131 by screws 134 and provides a pocket, open at the top, for receiving the light tight slide. Also, a shown in FIG. 11, the film case 131 has an upper flange 135 which overlies the retainer frame 120 and which is slotted along the top at 136, the slot being lined with felt to provide the light tight characteristic when the slide is in place.

The film case 131 has a cavity 138 into which a film holder plate 139 is disposed. A film mounting plate 140 is fixed to the film holder plate and film is removably secured in some suitable manner to the film mounting plate.

The film holder plate 139 has four aligning screws 142 threaded into it, the aligning screws being slidable in bushings 143 fixed to the film case 131. The aligning screws 142 permit the film holder plate to move inwardly toward the taking screen.

The film holder plate 139 is movably secured to the film case 131 by a stud 144 which is threaded in a sleeve 145 rotatable on a bushing 146.

The sleeve 145 is secured to the bushing 146 by a snap ring 147. A knob 148 is secured to the bushing by a snap ring 149. The inner end of the stud 144 has a collar 150 fixed by screws 151 to the film holder plate 139.

The knob 148 is secured to the sleeve 145 to rotate the sleeve by a ball 153 which is biased toward the sleeve 145 by a spring 154 held at its other end by a set screw 155. The ball rides in a one-way groove 156 (viewing FIG. 14).

As the knob 148 is rotated counter-clockwise, it drives the stud 144 inwardly forcing the film holder plate 139 and film against the taking screen 128. As the force against the taking screen 128 exceeds a predetermined amount as determined by the stress on the spring 154, the ball 153 rides out of its groove 156 thus avoiding any damage to the taking screen 128.

The film case 131 is held in position on the retainer frame 120 by lock dogs 160 having film locking handles 161, the dogs being mounted on pins 162 secured to ears 163 fixed to the retainer frame 120. Compression springs 164 mounted on the pins 162 urge the lock dogs 160 into engagement with the film case 131.

A dial indicator 167 is mounted by a nut 168 to the rear frame plate 112 and has a probe 169 in engagement with the edge of the taking screen 128.

As shown in FIGS. 9 and 9A, the right hand edge of the taking screen is engaged by springs 170 secured in the retainer frame 120 which urge the taking screen 128 in a leftward direction. Referring again to FIG. 12, the taking screen 128 is forced by the springs 170 into contact with a pair of dowels 171, each secured to the end of a differential screw drive 172. Each differential screw drive includes an inner screw 173 threaded into an outer screw 174. The outer screw 174 is threaded into a sleeve 175 which is fixed to the rear frame plate 112. The two screws 173 and 174 have a slightly different pitch so that rotation of the outer screw 174 causes the inner screw 173 to move axially. The screws 173 and 174 are driven by a timing belt 178 wrapped about pulleys 179 and 180 which are fixed to the respective screws by a key 181.

Each dowel 171 is fixed to its respective screw 173 and is fixed at its inner end against rotation by a pin 176 passing through traverse bores in the taking screen plate 123.

The timing belt 178 is driven by a stepping motor 182 through a gear box 183 and a drive pulley 184. A knob 185 is connected to the drive shaft of the stepping motor 182 to permit it to be rotated by hand.

In setting up for operation, the knob 185 is rotated until an indication is made on the dial indicator 167, thereby indicating that the slack has been taken up in the taking screen, gears, belts, and the like and the camera is ready for its first exposure.

*Electrical circuit*

Referring to the circuit diagram of FIG. 15, the function of the electrical circuit is to drive the stepping motor 182 to cause the taking screen to move in increments with respect to the film; to start and stop the variable speed motor 56 which swings the camera in increments through its excursion about the object being photographed and to operate a shutter in the camera lens holder 85. The shutter is not shown but a solenoid 200 for operating the shutter is shown in the lower portion of the circuit diagram. The circuit is supplied by a source of 110 volt alternating current voltage 201 connected to a power pack 202 and amplifier power supply 203 in which the voltage is transformed and rectified to provide the voltages indicated in the diagram and for power to the NOR and OR elements, etc.

The stepping motor 182 is a biflar type synchronous motor having four windings 205, 206, 207, and 208 which are selectively and alternatively energized by pulses fed to the windings through a translator circuit 209. The translator, using flip flop circuits, converts square wave pulses from an oscillator 210 to power pulses and switches the power pulses selectively to the four winding segments to cause the motor to step. In the illustrated embodiment, the motor and translator circuit, a product of the Superior Electric Company of Bristol, Connecticut, employs their "Slow-Synchronous Motor S150–1010." The oscillator or multi-vibrator 210 utilizing NOR-OR elements 211, generates 36 pulses per second although the number of pulses generated can be varied by the size of the capacitor 212. The pulses are fed to the translator through lines 214 and 215 through a switch 216. When the switch 216 is swung to the lower normal position indicated in broken lines, the pulses supplied are in a direction to cause the stepping motor to operate in a forward direction. When the switch 216 is swung to the upper normal position, the pulses are supplied in a direction to cause the stepping motor to operate in a reverse direction to return the taking screen to start position.

The number of pulses supplied to the stepping motor 182 may be preset and is controlled by a binary counter 220 connected to decoder 221. The binary counter is constituted by a series of flip flop circuits 222–227 which divide the incoming pulses by two and feed them to the inputs of the decoder 221. The outputs of the flip flop circuits are connected to the input of the decoder as indicated. The decoder has six switches A through F which may be selectively operated to determine the number of pulses supplied to the stepping motor 182. When zero voltage appears at the preselected inputs to the decoder, as determined by the number of pulses from the oscillator, the decoder through its OR element 230 and its NOR-OR element 231 applies a minus 20 volt direct current signal at its output 232. That signal applied through the line 233 stops the output of the oscillator 210 and consequently stops the flow of pulses to the stepping motor 182 whereupon the movement of the taking screen with respect to the film ceases.

The variable speed D.C. motor 56 is controlled by a relay R-1 which is normally energized by a minus 20 volt supply to cause the variable speed motor 56 to operate. During its operation, the camera is swung in its excursion about the object to be photographed. When the minus 20 volt D.C. signal appears at the output of the decoder, the relay R–1 is deenergized thereby opening the circuit to the motor. The solenoid 200 which operates the camera shutter is supplied by the 110 volt source 201 through relay contacts R–2–1 operated by a relay R–2. The contacts are closed by the energization of relay R–2. The relay R–2 is energized through a time delay relay 235 after approximately five seconds following the appearance of the voltage at the output 232 of the decoder 221 thereby assuring the stopping of both motors before the shutter opens.

The binary counter has a reset circuit 240 including a flip flop circuit 241 connected through a time delay 242 to the reset line 234 associated with each of the flip flop circuits 222–227 of the binary counter. The output at 232 of the decoder 221 is applied to the flip flop circuit 241 which changes its state and applies a reset voltage to the flip flop circuits of the binary counter. The time delay 242 delays the application of the pulses to the reset line 234 for approximately 10 seconds to provide assurance of the operation of the camera shutter before the operation of the multi-vibrator is resumed.

When the flip flop circuits are reset to their original state, the output voltage at 232 of the decoder 221 is removed thereby permitting the multi-vibrator to resume its operation and returning the relays R–1 and R–2 to their normal condition. The flip flop circuit 241 of the reset circuit also returns to its normal condition.

*Operation*

In exposing a film to form a lineiform image, the scene to be taken is set up and the camera focused on a central object in the scene. During the focusing operation, the frame plate 112 is swung to an open position and a ground glass screen is mounted on the camera rear frame 110. After focusing on the central object, the camera is moved through a complete excursion to make sure that background and foreground objects do not shift too great a distance with respect to the focal object. If too great a shift occurs, the camera can be backed away from the scene and the camera refocused.

The shutter is then closed and the ground glass removed. The frame plate 112 is swung to a closed position and locked by manipulation of the handle 114. The film case, having a light tight slide covering the film, is then mounted on the retaining frame 120 and securely held in place by the locking handles 161 and their associated lock dogs. The light tight slide is removed and knob 148 is rotated to bring the film into engagement with the taking screen 128.

The stepping motor 182 is manually operated by rotating the knob 185 until the dial indicator 167 shows that the slack has been taken out of the driving elements. These operations having been completed, the camera is ready for operation to make its multiple exposures of the scene.

The switch 216 is swung to the broken line position connecting the multi-vibrator through the translator 209 to drive the motor in a forward direction. The decoder switches A through F are set to the desired count which had been previously programmed for the particular taking screen used. The count switch 243 is turned to "on" position and the power switch 244 is closed, thereby starting the count.

The stepping motor 182 moves the taking screen through its incremental distance while the motor 56 swings the camera through its incremental of its excursion. The two motors stop, the shutter opens and closes and the operation is resumed. This sequence of operations is repeated until ten exposures have been made, this being the number of exposures required to fill the film in the illustrative embodiment.

*Alternative embodiment*

In the circuit just described, the taking screen is driven by a stepping motor 182 and the camera is swung through its excursion by a variable speed direct current motor 56, operating through change gears 64. In an alternative form of the invention, as illustrated in FIGS. 16 and 17, the drive for the camera is provided by a rear stepping motor 250 and a front stepping motor 251. The rear stepping motor is connected to a pulley 252 which drives a timing belt 253, passing over an idler pulley 254. The timing belt 253 is connected to rear support block 27. A front timing motor 251 drives a pulley 255 which is connected to a timing belt 256, passing over an idler pulley 257. The timing belt 256 is connected to the front support block 26.

The stepping motors 250 and 251 are operated by means of an electrical circuit illustrated on FIG. 17 so as to drive the forward and rearward ends of the camera through its excursion in timed relation to the movement of the taking screen.

The taking screen and the front and rear stepping motors are pulsed by oscillators 260, 261, and 262, respectively. The output of each oscillator indicated at 263 is connected to a translator 264 which is substantially identical to the translator 209 described above, the output of the translator indicated at 265, driving the stepping motor. The connection of each oscillator to its translator is through a parallel circuit including AND elements 266 and 267 which are connected to the forward and reverse paths of the translator circuit respectively.

The oscillators operate continuously but the frequency of their operation is variable, as, for example, between 20 and 200 cycles per second. When one of the AND elements in the oscillator output is conductive, the taking screen will be driven in a forward or reverse direction, depending upon which AND element is conducting, the speed of movement of the stepping motor being dependent upon the frequency of the oscillator with which it is associated. By controlling the conductivity of the AND elements and by preselecting the frequency of the respective oscillators, the camera can be swung about a wide variety of focal points with precise coordination between the movement of the taking screen and the movement of the camera.

The conductivity of the AND elements 266 and 267 may be controlled manually by push button switches 270 which are connected to a 20 volt supply, the switches connecting the 20 volt supply through OR elements 271 to the respective AND elements. Automatic control of the conductivity or gating of the AND elements is provided by a binary counter and decoder (BCD) 273 which is fed by an adjustable oscillator 274. The counter and decoder is similar to the counter and decoder 220–221 described in connection with FIG. 15. The output of the counter and decoder is connected to flip flop circuits 275, 276, 277, 278, and 279.

At the flip flop circuit 275, the start connection is made to the output associated with the first pulse of the counter and the reset connection is made to the connection associated with 225th pulse of the counter and decoder. The output of the flip flop 275 is connected to the reverse OR elements 271 associated with the rear and front stepping motors.

Flip flop 276, whose output is connected to the reverse OR element 271 associated with the taking screen stepping motor, is connected to the counter and decoder for start operation at the first pulse and for reset at the 245th pulse. Flip flop circuit 277, whose output is connected to the forward OR element of the taking screen stepping motor, is connected for start operation at the 255th pulse and for reset at the 275th pulse. Flip flop circuit 278, whose output is connected to the forward OR elements 271 of the front and rear stepping motors, is connected to the counter and decoder for start operation at the 280th pulse and for reset at the 730th pulse. Flip flop circuit 279, whose output is connected to the reverse or elements 271 of all three stepping motors, is connected for start operation at the 750th pulse and for reset at the 975th pulse.

The output of the flip flop circuit 278 is also connected to the shutter circuit 200 and, through a flip flop 280, to a flash test circuit 281.

A circuit thus far described is suitable for operating the camera in such a manner such as to make a continuous sweep about the object to be photographed with the shutter open. The additional circuitry required to take intermittent shots in the formation of the lineiform image will be described below.

At the count of one, all motors will start running to drive all of the equipment to the left. At the count of 225, the camera motors will have driven the camera to its full left position. The taking screen motor will continue to run to the count of 245 and then stop. At a count of 255, the taking screen will reverse its movement in the forward direction, and will continue to run a count of 275. At a count of 280, all motors will start the forward traverse of the camera, and the taking screen will move in the forward direction. At a count of 730, all motion will stop at the full right position. At a count of 750, all drives will start to return the camera and taking screen to the center position. At a count of 990, the program will stop. The shutter opens at count 280, and the flash test circuit is energized at that count.

To provide for intermittent operation of the camera stepping motors and the taking screen stepping motor, additional circuitry is connected to the start and reset connections of flip flop circuit 278, the additional circuitry being connected through OR elements 285 and 286, respectively.

The output of the counter and decoder 273 at the 280th and 730th counts are connected to the start and reset input connections respectively of a flip flop circuit 287. The output of the flip flop circuit is connected to an AND element 288 whose input is also connected to the oscillator 274 through a selected switch 295. The output of the AND element 288 is connected to a pair of counters indicated at 289. The output of the first counter is connected, as at 290, to the start connection of a flip-flop circuit 291. The output of the second counter, as at 292, is connected to the reset side of the circuit. The output of the flip flop circuit is connected to the OR element 286 which resets flip flop circuit 278 and is connected through a selector switch 293 to the shutter circuit 200. The output of 292 of the second preset counter is connected at 294 to reset the dual preset counter 289 and is connected through the OR element 285 to the start connection of flip flop circuit 278.

In the operation of this circuit, the selector switches 295 and 293 are set for intermittent operation. The movement of the stepping motors up to count 280 is as described above. At count 280, in addition to starting the simultaneous operation of all motors, the flip flop circuit 287 is pulsed, thereby connecting the oscillator 274 through the AND element 288 to the dual preset counter 289. When the first preset count is reached, after twenty pulses, for example, an output pulse appears at 290 to operate the flip flop circuit 291, causing an output to appear at the reset side of flip flop circuit 278, thereby stopping all three stepping motors. Simultaneously, a pulse is transmitted to the shutter circuit to shoot the first image.

After twenty-five more pulses, for example, are counted by the second preset counter, an output appears at 292 to reset flip flop circuit 291, a pulse will appear at OR element 285 to reverse the flip flop 278, thereby permitting the motors to start again, and a pulse will appear at the reset of the dual preset counter 289 to reset that counter. This operation is repeated until the required number of exposures is made and the count of 730 is present. At count 730, all motors are stopped, and at count 750, all motors are reversed as described above, until the center position is reached.

What is claimed is:

1. In a camera for taking parallax panoramagrams, a rear camera frame, taking screen means slidably mounted on said rear camera frame, an electrical pulse responsive stepping motor mounted on said frame for moving said taking screen means small preselected increments transversely of said rear camera frame, a film plate mounted on said rear camera frame, circuit means for operating said stepping motor, said circuit means comprising:
a multivibrator for generating pulses and having an output for said pulses connected to said stepping motor, and
means connected to said multivibrator for counting said pulses and terminating their flow to said stepping motor after a preselected number have been counted.

2. Apparatus comprising,
a table,
a camera supported on said table for taking parallax panoramagrams,
a stepping motor operably connected respectively to the forward end and rearward end of said camera for moving said ends transversely in a horizontal plane,
a rear camera frame,
taking screen means slidably mounted on said rear camera frame,
an electrical pulse responsive stepping motor mounted on said frame for moving said taking screen means small preselected increments transversely of said rear camera frame,
and circuit means for operating said stepping motors to move said screen transversely and to swing said camera in an incremental excursion about an object to be photographed.

3. Apparatus comprising,
a table,
a camera supported on said table for taking parallax panoramagrams,
means for moving the forward and rearward ends of said camera at different speeds,
said camera having a rear camera frame,
taking screen means slidably mounted on said rear camera frame,
an electrical pulse responsive stepping motor mount- on said frame plate for moving said taking screen means small preselected increments transversely of said rear camera frame,
circuit means for operating said stepping motor, said circuit means comprising,
a multivibrator for generating pulses and having an output for said pulses connected to said stepping motor,
a binary counter connected to said multivibrator output and having a plurality of outputs,
a decoder having a plurality of inputs connected respectively to the outputs of said counter and having a selector switch associated with each of said inputs, and
said decoder having an output connected to said multivibrator to terminate its flow of pulses to said stepping motor after a preselected number of pulses have been counted.

4. Apparatus comprising,
a table,
a camera supported on said table for taking parallax panoramagrams,
means for moving the forward and rearward ends of said camera at different speeds,
said camera having a rear camera frame,
taking screen means slidably mounted on said rear camera frame,
an electrical pulse responsive stepping motor mounted on said frame plate for moving said taking screen means small preselected increments transversely of said rear camera frame, circuit means for operating said stepping motor, said circuit means comprising, a multivibrator for generating pulses and having an output for said pulses connected to said stepping motor, a binary counter connected to said multivibrator output and having a plurality of outputs, a decoder having a plurality of inputs connected respectively to the outputs of said counter and having a selector switch associated with each of said inputs, said decoder having an output connected to said multivibrator to terminate its flow of pulses to said stepping motor after a preselected number of pulses have been counted, said camera having a shutter, and said circuit means including time delay means for operating said shutter after said pulses have been terminated.

5. Apparatus comprising, a table, a camera supported on said table for taking parallax panoramagrams, means for moving the forward and rearward ends of said camera at different speeds, said camera having a rear camera frame, taking screen means slidably mounted on said rear camera frame, an electrical pulse responsive stepping motor mounted on said frame plate for moving said taking screen means small preselected increments transversely of said rear camera frame, circuit means for operating said stepping motor, said circuit means comprising, a multivibrator for generating pulses and having an output for said pulses connected to said stepping motor, a binary counter connected to said multivibrator output and having a plurality of outputs, a decoder having a plurality of inputs connected respectively to the outputs of said counter and having a selector switch associated with each of said inputs, said decoder having an output connected to said multivibrator to terminate its flow of pulses to said stepping motor after a preselected number of pulses have been counted, said camera having a shutter, said circuit means including time delay means for operating said shutter after said pulses have been terminated, and time delay means for recycling said circuit means after said shutter has been operated.

6. Apparatus comprising, a table, a camera supported on said table for taking parallax panoramagrams, stepping motor operably connected respectively to the forward end and rearward end of said camera for moving said ends traversely in a horizontal plane, a rear camera frame, taking screen means slidably mounted on said rear camera frame, an electrical pulse responsive stepping motor mounted on said frame for moving said taking screen means small preselected increments traversely of said rear camera frame, circuit means for operating said stepping motors to move said screen traversely and to swing said camera in an incremental excursion about an object to be photographed, said circuit means including:

an adjustable frequency oscillator connected through a pair of parallel AND elements to each said stepping motor for forward and reverse operations, a binary counter and decoder connected at preselected count outputs to said AND elements, for gating said AND elements to operate said motors first in a reverse direction and then in a forward direction, a flip flop circuit having its input connected to said counter and decoder across a span of counts, the output of said circuit forming the gating connections to the AND elements of all motors associated with the forward direction, and preset counter means connected to said flip flop circuit to start and reset said circuit at predetermined intervals within said span of counts.

7. Apparatus comprising, a table, a camera supported on said table for taking parallax panoramagrams, a first motor means for moving the forward and rearward ends of said camera horizontally at different speeds, a frame plate pivotally attached to the rear of said camera, a taking screen means slidably mounted on said frame plate, a second motor means mounted on said frame plate adjacent to said taking screen means for moving said taking screen means small preselected increments transversely of the rear of the camera, and circuit means for operating said first and second motor means in adjustable preselected relationships with respect to one another.

8. Apparatus according to claim 7 wherein said circuit means comprises, a multivibrator for generating pulses having an output for said pulses connected to said second motor means, and means connected to said multivibrator for counting said pulses and terminating their flow to said second motor means after a preselected number have been counted.

9. Apparatus according to claim 7 further comprising, a film case and film holder movable with and removably mounted on said frame plate adjacent to said taking screen means, and adjustable means on said film case for moving said film holder into juxtaposition with said taking screen means.

10. Apparatus according to claim 9 wherein the adjustable means comprises, a threaded stud securely attached to said film holder, and a bushing fastened to said film case, said bushing carrying a threaded rotatable sleeve in mating relationship with said stud whereby rotation of said sleeve will move said film holder in a direction perpendicular with respect to the plane of said film case.

References Cited

UNITED STATES PATENTS

| | | | |
|---|---|---|---|
| 1,950,374 | 3/1934 | Kanolt | 95—18 |
| 1,977,310 | 10/1934 | Kanolt | 95—18 |
| 2,063,985 | 12/1936 | Coffey | 95—18 |
| 2,158,660 | 5/1939 | Kanolt | 95—18 |
| 2,485,811 | 10/1949 | Bonnet | 95—18 |
| 2,566,110 | 8/1951 | Backus | 95—18 |
| 2,572,994 | 10/1951 | Dudley | 95—18 |
| 1,170,039 | 2/1916 | Belanger | 95—49 X |
| 1,184,404 | 5/1916 | Worthen | 95—49 X |
| 1,347,794 | 7/1920 | Saalburg | 95—18 |
| 1,968,768 | 7/1934 | Johansen | 95—18 |

JOHN M. HORAN, *Primary Examiner.*